United States Patent Office 3,211,678
Patented Oct. 12, 1965

3,211,678
COPOLYESTER FOAMS BY TREATMENT WITH A BIS(AZIDOFORMATE) MODIFYING AGENT AND A BLOWING AGENT
Anderson E. Robinson, Wilmington, Del., assignor to Hercules Powder Company, Wilmington, Del., a corporation of Delaware
No Drawing. Filed Aug. 6, 1963, Ser. No. 300,188
10 Claims. (Cl. 260—2.5)

This invention relates to a process for preparing polymer foams. More particularly, the invention relates to a process for preparing modified foams of poly(aliphatic glycol terephthalate hydrocarbon dicarboxylate) and to the modified foams so prepared.

It is known to use various polymers in the preparation of expanded materials, such as foams, by incorporating in the polymer a chemical blowing agent, which under the influence of heat evolves gas whereby cells are formed and the expansion of these cells produces a foamed product of low density. The critical factor in the formation of a closed cell foamed product of low density is the ability of the cell walls to stretch without bursting and to attain a degree of rigidity in the stretched state. The aliphatic glycol terephthalate hydrocarbon dicarboxylate polymers are not convertible into satisfactory forms with the usual foaming or blowing agents for this reason.

Now in accordance with this invention it has unexpectedly been found that modified foams of poly(aliphatic glycol terephthalate hydrocarbon dicarboxylate) can be prepared in a one-step heating process, with or without the application of pressure, by heating a blend of said polymer, a blowing agent and an azidoformate compound at a temperature sufficient to release the gas from said blowing agent, which temperature is also effective for the modification reaction with the azidoformate compound whereby blowing and modification of said polymer is effected. By using this process, it is possible to produce either rigid or flexible foams of any desired density, having uniform closed cell structures. In addition, by regulating the amount of azidoformate used, it is possible to produce either infusible, insoluble or thermoplastic soluble foams.

The azidoformate compounds used in accordance with this invention are solids or oils having a boiling point of at least about 100° C. at a pressure of 70 mm. of mercury and having the general formula

where x is at least 2, preferably from about 2 to about 100, and R is an organic radical, inert to modification reactions, containing at least one carbon atom per azidoformate group. Exemplary of the azidoformates used are the alkyl azidoformates such as n-octadecyl azidoformate, tetramethylene - bis(azidoformate), pentamethylene - bis (azidoformate); the cyclic alkyl azidoformates, such as 1,4-cyclohexanedimethyl - bis(azidoformate), 2-(1-p-menthenyl-8-oxy)ethyl azidoformate; 2-norborn-5-enyl methylene azidoformate; the aralkyl azidoformates such as α,α'-p-xylylene-bis(azidoformate); the aromatic azidoformates such as phenyl azidoformate, 2,2-isopropylidene-bis(p,p'-phenyl azidoformate); the azidoformate ethers such as 2,2'-oxydiethyl-bis(azidoformate), 2,2'-oxydipropyl-bis(azidoformate), 2,2'-ethylenedioxydiethyl - bis(azidoformate), the tetraazidoformate of pentaerythritol-propylene oxide adduct having the general formula

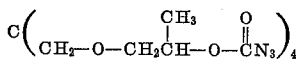

the azidoformate thioethers such as 2,2'-thiodiethyl-bis (azidoformate), and 4,4'-thiodibutyl - bis(azidoformate).

It will, of course, be obvious to those skilled in the art that still other azidoformates containing functional groups, which are inert to modification reactions, such as halogen, COOR, and

groups, are included in the above definition. The azidoformates used in this invention can be prepared in various ways, as for example by reacting the respective chloroformate with an excess, i.e., from about 1.05 mole to about 10 moles per equivalent of chloroformate, of an alkali azide.

Any of the well-known chemical blowing agents can be used in the preparation of the foams in accordance with this invention as, for example, azodicarbamide, azo bis (formamide), diazoaminobenzene, N,N'-dinitrosopentamethylene tetramine, N,N' - dimethyl - N,N'-dinitrosoterephthalamide, p,p'-oxy-bis(benzene sulfonyl semicarbazide), azo bis(isobutyronitrile), p,p'-oxy bis(benzene sulfonyl hydrazide), p,p'-diphenyl-bis(sulfonyl hydrazide), benzene-sulfonyl hydrazide, and m-benzene-bis(sulfonyl hydrazide). Any of the well-known solvent blowing agents can also be used in this invention, as for example, monochlorotrifluoromethane, monochlorodifluoromethane, dichlorotetrafluoroethylene, trichloroethylene, chloroform, carbon tetrachloride, methylene chloride, ethylene chloride, and low boiling hydrocarbons, such as butane, pentane, hexane, and toluene. Accordingly, any compound which decomposes or volatilizes to yield at least one mole of gas per mole of blowing agent at a temperature of about 190° C. at atmospheric or lower pressure can be used.

The poly(aliphatic glycol terephthalate hydrocarbon dicarboxylate) of this invention is an aliphatic glycol ester of a mixture of terephthalic acid and at least one other hydrocarbon dicarboxylic acid having 8 to 36 carbons. The hydrocarbon dicarboxylic acid used in admixture with the terephthalic acid is exemplified by isophthalic acid, hexahydroterephthalic acid, hexahydroisophthalic acid, adipic, suberic, azelaic acid, sebacic acid, and linoleic acid dimer. In these esters, the aliphatic glycol is a saturated glycol, such as: ethylene glycol, propylene glycol, trimethylene glycol, or diethylene glycol. Preferably, it is a hydrocarbon glycol. The molecular percentages of components of the ester are 50 mole percent glycol, 15 to 45 mole percent terephthalic acid (preferably 25–35 mole percent), 5 to 35 mole percent other hydrocarbon dicarboxylic acid (preferably 15–25 mole percent). The hydrocarbon dicarboxylic acid may be a single acid or a mixture of two or more of the acids of this class in any desired ratio.

The glycol terephthalate hydrocarbon dicarboxylate used in accordance with this invention will have a molecular weight in the range of 2,500 to 160,000, and a specific viscosity (25° C.) for a 1% solution in a phenol-tetrachlorethane (60:40 weight ratio) in the range of about 0.25 to about 2.00, preferably about 0.45 to about 1.25.

Various types of foams can be prepared from the ester polymers described above, depending upon the specific polymer used. For example, the ester polymers rich in carbocyclic rings, such as benzene rings or hydrobenzene rings, yield rigid and semi-rigid foams. Flexible foams are obtained from these same ester polymers when used as plastisols and from the ester polymers rich in acyclic chains.

In preparing foams in accordance with this invention, the ester polymer is first blended with an azidoformate and a blowing agent. Any desired means can be used to bring about this blending. When a solvent blowing agent is used, a convenient method for forming the desired expandable blend is to mix the ester polymer and an azidoformate, pass the mixture through an extruder, chop the extruded material into pellets and then soak the pellets in the solvent blowing agent until the desired amount of the latter has been absorbed. When a chemical blowing agent is used, the azidoformate and blowing agent can be mixed with a diluent (which can also contain a stabilizer or other modifier for the ester polymer), and then the polymer in finely divided form can be added and mixed into a slurry. On evaporation of the diluent an intimate mixture of the polymer, blowing agent and azidoformate is obtained. When an ester polymer plastisol is used, the azidoformate and blowing agent can readily be mixed into the dispersion.

The modifying and blowing of the above described expandable blends is then carried out by heating the blend to a temperature from about 120° C. to about 200° C. The period of time required to effect the desired degree of blowing will depend on the temperature and other conditions used, but will usually be about 3 minutes to about 3 hours, more preferably from about 5 minutes to about 1 hour. The exact temperature to be used will then depend on the azidoformate and blowing agent used, the length of time the blend is to be heated, and related factors. The modification and blowing usually take place simultaneously but may take place sequentially, depending on the type of foaming process used. Where blowing is conducted in an open vessel, cross-linking will usually be required to prevent the foam from collapsing but must not be complete before expansion. Best results can be obtained by selecting an azidoformate and blowing agent which decompose (or volatilize in the case of the solvent blower) at about the same temperature.

The amount of azidoformate used in the preparation of the foams will be from about 0.1% to about 20%, more practically, from about 1% to about 10%, by weight of the polymer. The amount of blowing agent incorporated will obviously depend upon the degree of blowing desired, that is, the density desired for the final foamed product and the type of blowing agent used. In general, the amount will be within the range of from about 1% to about 30% by weight of the polymer.

The following examples are presented for purposes of illustration, parts and percentages being by weight unless otherwise specified.

*Example 1*

This example illustrates the preparation of a flexible foam from a poly(ethylene terephthalate azelate) organisol, a blowing agent and tetramethylene bis(azidoformate). The following formulation was prepared:

Ingredients: Parts
Poly ester a ------------------------------ 50
  Ethylene glycol—50 mole percent.
  Terephthalic acid—25 mole percent.
  Azelaic acid—25 mole percent.
Ethylene dichloride (blowing agent) --------- 100
1,4-cyclohexanedimethyl bis(azidoformate) --- 2.5 a Polyester having a specific gravity of 1.27 at 25° C. and a specific viscosity of 0.79 determined at 25° C. on a 1% solution in a 60:40 mixture of phenol:tetrachloroethane.

The formulation was prepared and solvent allowed to evaporate below 50° C., to form a 1/16 inch film. A 2 x 3 inch sample of this film, containing 14% residual ethylene dichloride, was placed in a two-piece steel mold 2 x 3 x ¼ inches in size and heated between 625 p.s.i. pressure plates, heated at 150° C. for 30 minutes. On release of the pressure, a foam slab of a size of 4 x 6 x ½ inches was obtained. This slab was of the closed, small, uniform cell type. It was flexible and resilient. Its insolubility in ethylene dichloride was 82%. The density was 6.9 pounds per cubic foot.

*Example 2*

Following the procedure of Example 1, a sample of poly(ethylene terephthalate hexahydroterephthalate) in which the mole percents of its components were 50% ethylene glycol, 25% terephthalic acid, and 25% hexahydroterephthalic acid and having a specific viscosity of 0.71, was used in place of poly(ethylene terephthalate azelate). The film, containing 24% residual ethylene dichloride, subjected to curing was converted into a closed cell foam of small pore size, having an insolubility in ethylene dichloride of 68% and a foam density of 4.8 pounds per cubic foot.

*Example 3*

Following the procedure of Example 1, a sample of poly(ethylene terephthalate isophthalate), in which the mole percents of its components were 50% ethylene glycol, 20% terephthalic acid, and 30% isophthalic acid, and having a specific viscosity of 0.71, was used in place of poly(ethylene terephthalate azelate). The film, containing 11% residual ethylene dichloride, subjected to curing was converted into a closed cell foam of small pore size having an insolubility in ethylene dichloride of 15% and a density of 8.1 pounds per cubic foot.

*Example 4*

A solution of 50 parts poly(ethylene terephthalate azelate), 0.5 part 1,4-cyclohexanedimethyl bis(azidoformate), 100 parts ethylene dichloride, and 3 parts 4,4'-oxy-bis(benzene sulfonyl hydrazide), as blowing agent, was evaporated to a film of about 1/16 inch thickness and free of ethylene dichloride. A 2 x 3 inch sample of this film was heated at 625 p.s.i. between heated plates at 150° C. for 30 minutes and then cooled to about 30° C. and released. The product was a flexible foamed block of about 4 x 6 x ½ inches in size, in which the cells were closed, small, and uniform. The density was 7.0 pounds per cubic foot. This foam swelled in ethylene dichloride and collapsed since the modifier was only sufficient to stabilize the cell structure without effecting measurable cross-linking.

*Example 5*

Example 1 was repeated except that the sample was heated in the mold for only 15 minutes at 150° C. by quenching with cold water to cool to room temperature at the end of 15 minutes. The resultant product was a foam 2 x 3 x ¼ inches in size of about 20 pounds per cubic foot density and it was not demonstrably insoluble in ethylene dichloride. A sample, 2 x 3 x ⅛ inches in size, was cut from this sample, placed in the mold and heated for 15 minutes at 150° C. The foamed slab, on removal from the mold, was a flexible, closed cell foam of uniform, small pore size, having a density of 9.2 pounds per cubic foot and was 76% insoluble in ethylene dichloride.

In the above examples, percent insoluble was determined as follows: A one-half inch diameter by 0.5 inch long specimen was weighed and macerated in an excess of ethylene dichloride for 4 hours at 80° C. The specimen was then dried in vacuum for 4 hours at 80° C. and reweighed. The initial and dry weights were each corrected (for non-polymer components of the specimen) to a 100% polymer base. From these figures, percent insoluble is calculated by the formula $$\frac{\text{corrected dry weight}}{\text{corrected initial weight}} \times 100 = \text{percent insoluble}$$

The modification of the polyester which makes possible the foaming process of this invention is measurable by a decrease in melt flow. The decrease in melt flow gives improved strength to the cell walls of the foam, resulting in a stable foam. At higher degrees of modification, cross-linking manifests itself by continued decrease in melt flow and, in addition, an insolubilization of the polyester. In Example 4 is shown the production of a stable foamed polyester by a low degree of modification and in Examples 1, 2, 3, and 5 are shown the production of foams of higher degrees of modification with cross-linking. The extent of cross-linking is indicated by the percent insoluble data in these examples. By the process of this invention, it is thus possible to produce foams of various degrees of solubility and stiffness.

What I claim and desire to protect by Letters Patent is:

1. A process for preparing a modified cellular polyester resin which comprises heating a blend of a poly(aliphatic glycol terephthalate hydrocarbon dicarboxylate) with a blowing agent and a modifying agent selected from the azidoformates having a boiling point of at least about 100° C. at a pressure of 70 mm. of mercury and having the general formula

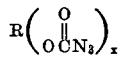

where $x$ is at least 2 and R is an organic radical inert to modification reactions, at a temperature in the range of about 120° C. to about 200° C. sufficient to release gas from said blowing agent, whereby blowing and modification of the polymer are effected.

2. The process of claim 1 wherein the azidoformate is tetramethylene bis(azidoformate).

3. The process of claim 1 wherein the polymer is poly(ethylene terephthalate azelate).

4. The process of claim 1 wherein the polymer is poly(ethylene terephthalate hexahydroterephthalate).

5. The process of claim 1 wherein the polymer is poly(ethylene terephthalate isophthalate).

6. An expandable polyester resin composition comprising a blend of
   (1) a poly(aliphatic glycol terephthalate hydrocarbon dicarboxylate),
   (2) a blowing agent, and
   (3) an azidoformate having a boiling point of at least about 100° C. at a pressure of 70 mm. of mercury and having the general formula

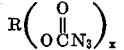

where $x$ is at least 2 and R is an organic radical inert to modification reactions.

7. The composition of claim 6 wherein the polymer is poly(ethylene terephthalate azelate).

8. The composition of claim 6 wherein the polymer is poly(ethylene terephthalate hexahydroterephthalate).

9. The composition of claim 6 wherein the polymer is poly(ethylene terephthalate isophthalate).

10. A polyester resin foam prepared by heating the composition of claim 6.

No references cited.

MURRAY TILLMAN, *Primary Examiner.*